(12) United States Patent
Lee

(10) Patent No.: US 10,200,317 B2
(45) Date of Patent: Feb. 5, 2019

(54) SERVICE SYSTEM FOR PROVIDING SERVICE USING SOCIAL GROUP COMMUNITY FUNCTION AND METHOD THEREFOR

(71) Applicants: LINE Studio Corporation, Seongnam-si, Gyeonggi-do (KR); LINE Up Corporation, Seongnam-si, Gyeonggi-do (KR)

(72) Inventor: Yong Hyun Lee, Seongnam-si (KR)

(73) Assignee: Line Up Corporation, Seongnam-si (KR)

( * ) Notice: Subject to any disclaimer, the term of this patent is extended or adjusted under 35 U.S.C. 154(b) by 477 days.

(21) Appl. No.: 14/838,292

(22) Filed: Aug. 27, 2015

(65) Prior Publication Data
US 2016/0212072 A1    Jul. 21, 2016

(30) Foreign Application Priority Data

Jan. 15, 2015  (KR) .................. 10-2015-0007530

(51) Int. Cl.
*H04L 12/58*    (2006.01)
*H04L 29/06*    (2006.01)

(52) U.S. Cl.
CPC .......... *H04L 51/043* (2013.01); *H04L 51/046* (2013.01); *H04L 51/28* (2013.01); *H04L 51/32* (2013.01)

(58) Field of Classification Search
CPC ..... H04L 51/043; H04L 51/046; H04L 51/28; H04L 51/32
(Continued)

(56) References Cited

U.S. PATENT DOCUMENTS 8,550,920 B1 * 10/2013 Allen .................. G07F 17/3241
                                                        463/25
9,413,809 B1 *  8/2016 Morse ..................... H04L 67/02
(Continued)

FOREIGN PATENT DOCUMENTS

JP    2009-526598 A    7/2009
JP    2013-003771 A    1/2013
(Continued)

OTHER PUBLICATIONS

Japanese Office Action dated Jan. 4, 2017 issued in corresponding Japanese Application No. 2016-005431 (no English translation).
(Continued)

*Primary Examiner* — Moustafa M Meky
*Assistant Examiner* — Elizabeth Kassa
(74) *Attorney, Agent, or Firm* — Harness, Dickey & Pierce, P.L.C.

(57) ABSTRACT

A service system for providing a service using a social group community function and a method therefor are provided. The method includes transmitting information, on a list of a chat room associated with a content providing service among a plurality of chat rooms managed in the SNS, to a server which provides the content providing service according to a request from the server which provides the content providing service a user of the SNS accesses, receiving information about a chat room selected by the user on the list of the chat room and link information from the server, and providing the link information to participants of the selected chat room through the selected chat room.

24 Claims, 8 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 2003/0005151 | A1* | 1/2003 | Ullman | G06K 13/0825 709/238 |
| 2003/0041092 | A1* | 2/2003 | Woo | G06Q 10/107 709/200 |
| 2005/0050151 | A1* | 3/2005 | Mitchell | G06Q 10/107 709/207 |
| 2011/0201430 | A1* | 8/2011 | Maribona | G07F 17/32 463/42 |
| 2013/0173710 | A1* | 7/2013 | Seo | H04L 67/12 709/204 |
| 2013/0311906 | A1* | 11/2013 | Mackin | H04L 51/32 715/758 |
| 2014/0143682 | A1* | 5/2014 | Druck | G06Q 10/107 715/752 |
| 2014/0215361 | A1* | 7/2014 | Hwang | H04L 12/1818 715/758 |
| 2014/0317175 | A1* | 10/2014 | Kim | H04L 51/32 709/203 |
| 2015/0178952 | A1* | 6/2015 | Honda | A63F 13/12 345/619 |

FOREIGN PATENT DOCUMENTS

| | | | |
|---|---|---|---|
| KR | 2007-0082395 A | | 8/2007 |
| KR | 2013-0111868 A | | 10/2013 |
| KR | 2014-0095630 A | | 8/2014 |
| WO | WO 2008/023926 | * | 8/2007 |

OTHER PUBLICATIONS

"Only Reading This Can Make You Use Line Perfectly!! How to Use & Set Up Line, Line Convenience Guide for Fifty Million People." (Document disclosing a well-known technique) Mar. 10, 2014; pp. 16-55 (no English translation).
Korean Office Action dated Sep. 8, 2015 issued in corresponding Korean Application No. 10-2015-0007530.

* cited by examiner

SERVICE SYSTEM FOR PROVIDING SERVICE USING SOCIAL GROUP COMMUNITY FUNCTION AND METHOD THEREFOR

CROSS-REFERENCE TO RELATED APPLICATIONS

A claim for priority under 35 U.S.C. § 119 is made to Korean Patent Application No. 10-2015-0007530 filed Jan. 15, 2015, in the Korean Intellectual Property Office, the entire contents of which are hereby incorporated by reference.

BACKGROUND

Example embodiments of the inventive concepts described herein relate to a service system for providing a service using a social group community function and a method therefor.

A user wants to receive a service together with his or her friends while receiving the service through the Internet. For example, the user may want to play a game together with his or her friends or may appreciate a video, which is currently reproducing on the Internet, together with his or her friends.

In the related art, the user should separately contact his or her friends using a method (e.g., telephone conversion, text message sending, chatting, and the like) which is independent of a service. The user should encourage his or her friends to subscribe to a using service.

Particularly, for the user to enjoy specific content among a plurality of content provided from a specific service together with friends, he or she should separately give an explanation such that friends access the corresponding service and find the specific content.

For example, when the user detects a new dungeon B among a plurality of dungeons which are present in a game A and finds friends to play the dungeon B together, he or she makes a call to friends to play the dungeon B together one by one. Alternatively, the user should give an explanation for playing the dungeon B together using group chatting of a social network service (SNS) and should give an explanation for a detailed method (e.g., a position or access condition of the dungeon) for entering the dungeon B.

Specific game services provide a function of transmitting an invitation to users who currently access a game. However, the specific game services may not invite users who do not access the game and should invite all friends one by one.

Also, to receive specific content of a service together with an unspecified number of users, the user should open related content on a bulletin board associated with the service. Also, details for sharing the corresponding content should be explained through the bulletin board.

In the related art, Patent Laid-Open Publication No. 2007-0082395 discloses a flash game inviting system using a URL and a method therefor. Patent Laid-Open Publication No. 2007-0082395 discloses a function of generating a URL for accessing a room and accessing a specific room through the URL. However, in the related art, a user should directly transmit the generated URL to his or her friends or an unspecified number of users. The other patent documents are below.

Patent Document: <PCT Application No. PCT/KR/2014/010167, U.S. Patent Laid-Open Publication No. 2014-0019540, U.S. Patent Laid-Open Publication No. 2013-0332543, U.S. Patent Laid-Open Publication No. 2013-0260893>

SUMMARY

Example embodiments of the present inventive concepts include a service method in a service system, implemented with a computer, for providing a social network service (SNS), the method comprising: transmitting information, on a list of a chat room associated with a content providing service among a plurality of chat rooms managed in the SNS, to a server which provides the content providing service according to a request from the server which provides the content providing service a user of the SNS accesses; receiving information about a chat room selected by the user on the list of the chat room and link information from the server; and providing the link information to participants of the selected chat room through the selected chat room, wherein the link information comprises a link for accessing content selected by the user or content the user receives among content of the content providing service provided through the server.

The chat room associated with the content providing service may be a chat room which includes other users, who establish human relations with the user in the SNS, as participants.

The chat room associated with the content providing service may be a chat room which includes a representative account of the content providing service, which is registered in the SNS, as a participant.

The chat room associated with the content providing service may be a chat room which includes at least one of other users, who does not establish human relations with the user in the SNS, as a participant.

The transmitting of the information on the list of the chat room associated with the content providing service to the server may further include: receiving information about at least some of members of the content providing service from the server; and generating a group chat room, which includes at least one of the at least some of the members as a participant, through the received information.

The generating of the group chat room may further include: transmitting a message, for encouraging the at least some of the members to subscribe to the SNS or participate in the group chat room, to the at least some of the members; and providing rewards to a user who subscribes to the SNS through a link included in the message or a user who participates in the group chat room through the message.

The transmitting of the information on the list of the chat room associated with the content providing service to the server may further include: providing an application program interface (API) for inquiring the list of the chat room to the server; and providing information on the list of the chat room associated with the content providing service through an API call from the server.

The content providing service may further include a game service, and wherein the link for accessing the content comprises at least one of a link for accessing a game room the user accesses or a link for moving a character of another user who accesses through the link to a position or an instance space determined according to the link on a virtual space provided in the game service.

Example embodiments of the present inventive concepts include a service method in a service system, implemented with a computer, for providing a content providing service, the method comprising: providing content to a user who accesses the content providing service; providing a user interface for inquiring a chat room of a social network service (SNS) to the user through interworking with the SNS; receiving information on a chat room list associated with the content providing service from a server which provides the SNS, according to a request of the user through the user interface; providing the information on the chat room list to the user and receiving selection of a chat room from the user; transmitting information about the selected chat room and a link generated for sharing the content to the server which provides the SNS; and providing the content to at least one of other users, who accesses through the link, wherein the link is provided to participants of the selected chat room through the server which provides the SNS.

The receiving of the information on the chat room list associated with the content providing service may further include: receiving a list of chat rooms which include other users, who establish human relations with the user in the SNS, as participants.

The receiving of the information on the chat room list associated with the content providing service may further include: receiving a list of chat rooms which include a representative account of the content providing service, which is registered in the SNS, as a participant.

The receiving of the information on the chat room list associated with the content providing service may further include: receiving a list of chat rooms which include at least one of other users, who does not establish human relations with the user in the SNS, as a participant.

The providing of the user interface for inquiring the chat room of the SNS to the user may further include: receiving an application program interface (API) for inquiring the chat room list from the server which provides the SNS; and generating the user interface for generating an API call to the server, which provides the SNS, using the API and providing the generated user interface to the user.

The content providing service may further include a game service, and wherein the providing of the content to the at least one of the other users, who accesses through the link, comprises: allowing the at least one of the other users to access a game room the user accesses or moving a character of the at least one of the other user, which accesses through the link, to a position or an instance space determined according to the link on a virtual space provided in the game service.

A computer-readable medium having embodied thereon a program for executing the methods discussed above.

Example embodiments of the present inventive concepts include a service system for providing a social network service (SNS), the system comprising: a processor configured to manage a chat room list; transmit information, on a chat room list associated with a content providing service to a server which provides the content providing service according to a request from the server which provides the content providing service a user of the SNS accesses; receive information about a chat room selected by the user on the chat room list associated with the content providing service and link information from the server; and provide the link information to participants of the selected chat room through the selected chat room, wherein the link information comprises a link for accessing content selected by the user or content the user receives among content of the content providing service provided through the server.

The processor may be configured to generate and manage a chat room which includes other users, who establish human relations with the user in the SNS, as participants.

The processor may be configured to generate and manage a chat room which includes a representative account of the content providing service, which is registered in the SNS, as a participant.

The processor may be configured to generate and manage a chat room which includes at least one of other users, who does not establish human relations with the user in the SNS, as a participant.

The content providing service may include a game service, and wherein the link for accessing the content comprises at least one of a link for accessing a game room the user accesses or a link for moving a character of another user who accesses through the link to a position or an instance space determined according to the link on a virtual space provided in the game service.

Example embodiments of the present inventive concepts include a service system for providing a content providing service, the system comprising: a processor configured to: provide content to a user who accesses the content providing service; provide a user interface for inquiring a chat room of a social network service (SNS) to the user through interworking with the SNS; receive information on a chat room list associated with the content providing service from a server which provides the SNS, according to a request of the user through the user interface; provide the information on the chat room list to the user and to receive selection of a chat room from the user; and transmit information about the selected chat room and a link generated for sharing the content to the server which provides the SNS, wherein the link is provided to participants of the selected chat room through the server which provides the SNS, and wherein the processor is configured to provide the content to at least one of other users, who accesses through the link.

The processor may be configured to receive a list of chat rooms which include other users, who establish human relations with the user in the SNS, as participants.

The processor may be configured to receive a list of chat rooms which include a representative account of the content providing service, which is registered in the SNS, as a participant.

The content providing service may include a game service, and wherein the processor is configured to allow the at least one of the other users to access a game room the user accesses or moves a character of the at least one of the other user, which accesses through the link, to a position or an instance space determined according to the link on a virtual space provided in the game service.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
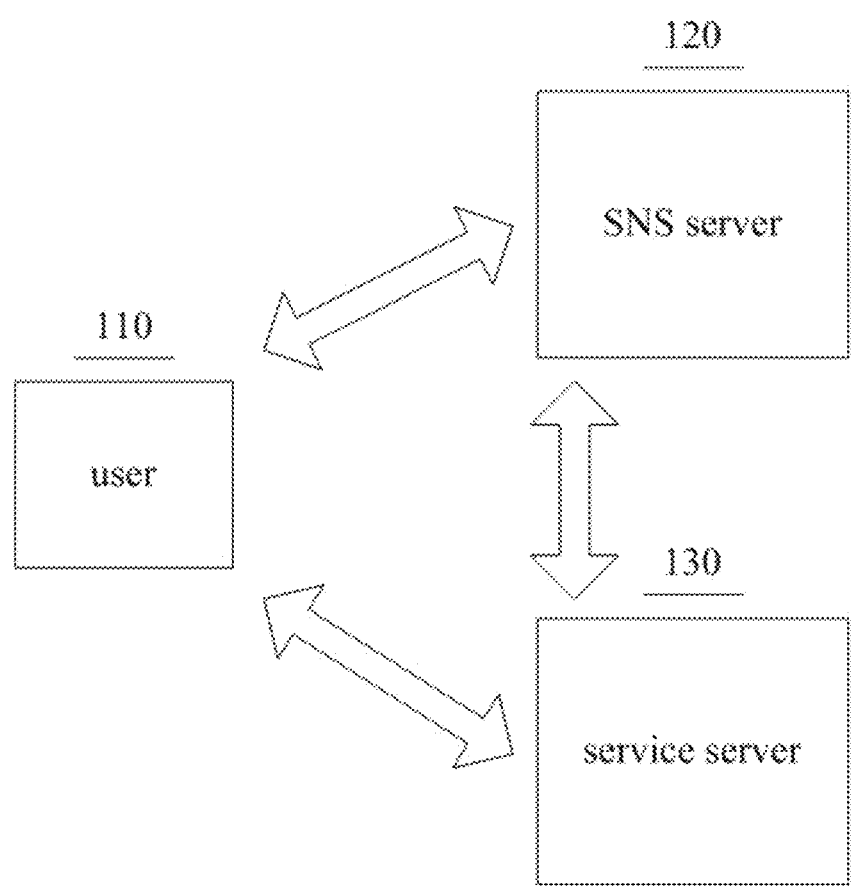
FIG. 1 is a drawing illustrating a service environment according to an example embodiment of the inventive concepts.

The inventive concepts will now be described more fully hereinafter with reference to the accompanying drawings, in which example embodiments of the inventive concepts are shown. The advantages and features of the inventive concepts and methods of achieving them will be apparent from the following example embodiments that will be described in more detail with reference to the accompanying drawings. It should be noted, however, that the inventive concepts are not limited to the following example embodiments, and may be implemented in various forms. Accordingly, the example embodiments are provided only to disclose the inventive concepts and let those skilled in the art know the category of the inventive concepts. In the drawings, example embodiments of the inventive concepts are not limited to the specific examples provided herein and are exaggerated for clarity.

The terminology used herein is for the purpose of describing example embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, example embodiments in the detailed description will be described with sectional views as ideal example views of the inventive concepts. Accordingly, shapes of the example views may be modified according to manufacturing techniques and/or allowable errors. Therefore, example embodiments of the inventive concepts are not limited to the specific shape illustrated in the example views, but may include other shapes that may be created according to manufacturing processes. Areas exemplified in the drawings have general properties, and are used to illustrate specific shapes of elements. Thus, this should not be construed as limited to the scope of the inventive concepts.

It will be also understood that although the terms first, second, third etc. may be used herein to describe various elements, these elements should not be limited by these terms. These terms are only used to distinguish one element from another element. Thus, a first element in some example embodiments could be termed a second element in other example embodiments without departing from the teachings of the present invention. Example embodiments of aspects of the present inventive concepts explained and illustrated herein include their complementary counterparts. The same reference numerals or the same reference designators denote the same elements throughout the specification.

Moreover, example embodiments are described herein with reference to cross-sectional illustrations and/or plane illustrations that are idealized example illustrations. Accordingly, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

As appreciated by the present inventive entity, devices and methods of forming devices according to various example embodiments described herein may be embodied in microelectronic devices such as integrated circuits, wherein a plurality of devices according to various example embodiments described herein are integrated in the same microelectronic device. Accordingly, the cross-sectional view(s) illustrated herein may be replicated in two different directions, which need not be orthogonal, in the microelectronic device. Thus, a plan view of the microelectronic device that embodies devices according to various example embodiments described herein may include a plurality of the devices in an array and/or in a two-dimensional pattern that is based on the functionality of the microelectronic device.

The devices according to various example embodiments described herein may be interspersed among other devices depending on the functionality of the microelectronic device. Moreover, microelectronic devices according to various example embodiments described herein may be replicated in a third direction that may be orthogonal to the two different directions, to provide three-dimensional integrated circuits.

Accordingly, the cross-sectional view(s) illustrated herein provide support for a plurality of devices according to various example embodiments described herein that extend along two different directions in a plan view and/or in three different directions in a perspective view. For example, when a single active region is illustrated in a cross-sectional view of a device/structure, the device/structure may include a plurality of active regions and transistor structures (or memory cell structures, gate structures, etc., as appropriate to the case) thereon, as would be illustrated by a plan view of the device/structure.

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

Example embodiments of the inventive concepts relate to a service system for providing a service using a social group community function and a method therefor.

FIG. 1 is a drawing illustrating a service environment according to an example embodiment of the inventive concepts. FIG. 1 illustrates a user 110, a social network service (SNS) server 120, and/or a service server 130.

The user 110 may be a terminal actually used by a user and may be a device, implemented with a computer, which may access the SNS server 120 and the service server 130 through a wired network or a wireless network.

The SNS server 120 may be a server device which provides an SNS to members. The service server 130 may be a server device which interworks with the SNS server 120 and provides a content providing service. For example, the service server 130 may be a system which provides at least one of various content providing services such as a video service or a game service, and may be a system of the same provider as that of an SNS or may be a third party system in view of a provider of the SNS.

The user 110 may be a member of the SNS provided from the SNS server 120 and may be simultaneously a member of the content providing service provided from the service server 130. In other words, the user 110 may access the SNS server 120 and may receive the SNS. The user may access the service server 130 and may receive the content providing service.

The SNS server 120 may manage a group chat room list associated with the user 110. Also, the SNS server 120 may interwork with the service server 130 and may transmit information on the group chat room list associated with the user 110 to the service server 130.

For example, the user 110 may access the service server 130 and may receive the content providing service (e.g., a game service). In an example embodiment, the service server 130 may provide a user interface for inquiring a group chat room of the SNS to the user 110 by interworking with the SNS server 120. When the user 110 wants to share content included in a service with other users, the user 110 may request the service server 130 to transmit information about a group chat room list through the user interface. In an example embodiment, the service server 130 may request the SNS server 120 to transmit the group chat room list associated with the user 110 according to the request of the user 110 and may receive information on the group chat room list associated with the user 110 from the SNS server 120.

The terminologies "group chat room" and "chat room" used herein may mean an online virtual space, including two or more participants, in which a variety of information, such as text, images, videos, and links, may be shared between the participants.

Figure 2:
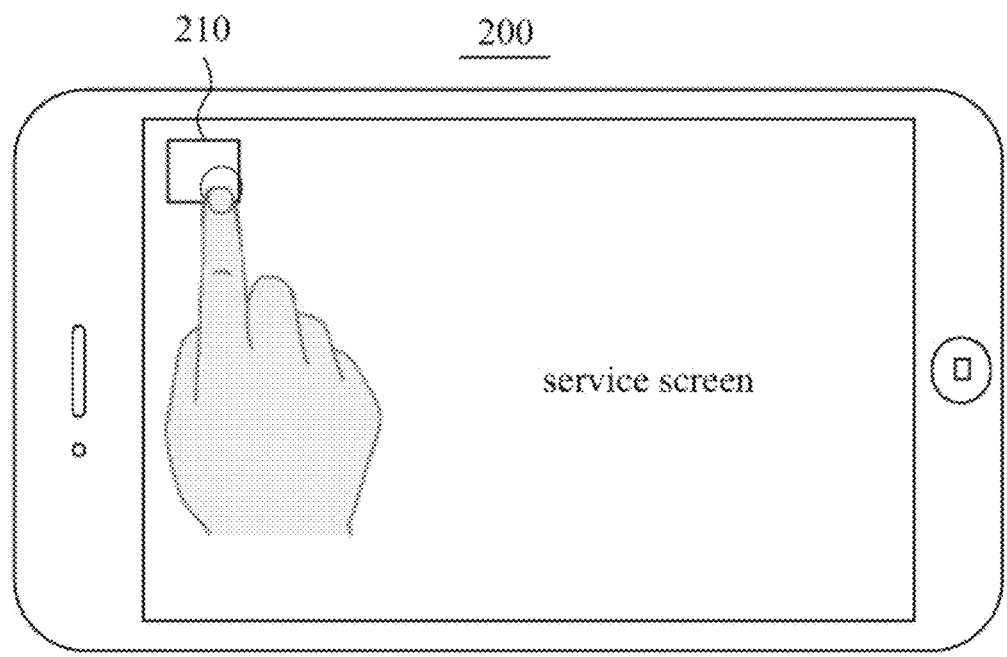
FIG. 2 is a drawing illustrating a service screen including a user interface for inquiring a group chat room according to an example embodiment of the inventive concepts.
Figure 3:
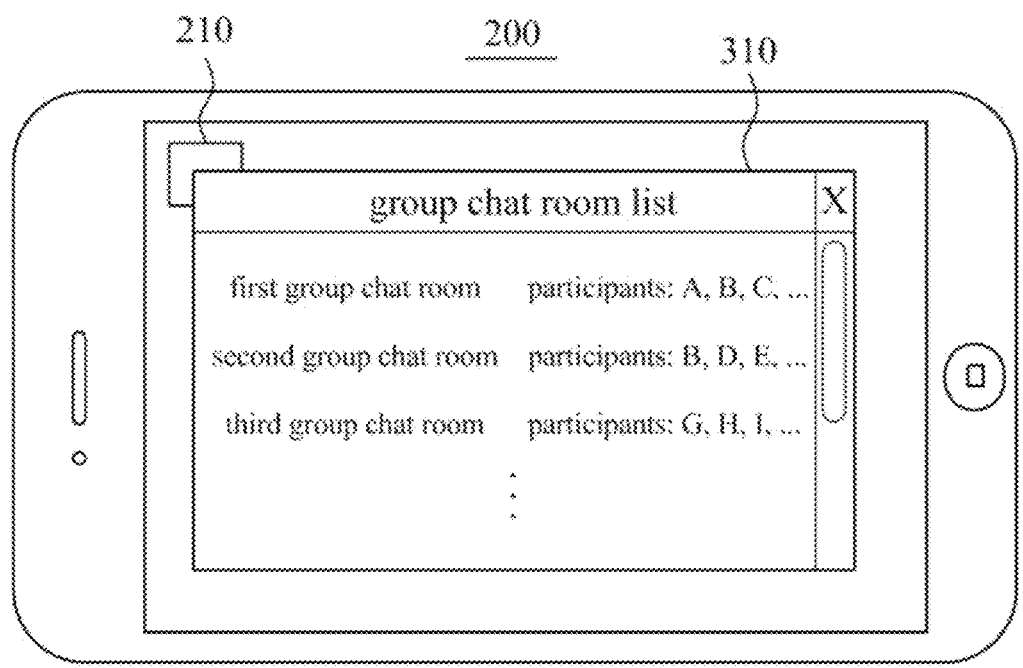
FIG. 3 is a drawing illustrating a service screen which displays a group chat room list according to an example embodiment of the inventive concepts.

FIG. 2 is a drawing illustrating a service screen including a user interface for inquiring a group chat room according to an example embodiment of the inventive concepts. FIG. 3 is a drawing illustrating a service screen which displays a group chat room list according to an example embodiment of the inventive concepts.

FIG. 2 illustrates an example of displaying a service screen of a content providing service provided from a service server 130 of FIG. 1 through a terminal 200 of a user 110 of FIG. 1. In an example embodiment, a user interface 210 for inquiring a group chat room through the service screen may be provided to the user 110. When the user 110 selects the user interface 210, a group chat room list associated with the user 110 may be provided to the user 110.

Herein, for one example, to select the user interface 210 may mean that a user taps a region of a touch screen, which displays the user interface 210, with his or her fingers in a mobile environment including the touch screen. For another example, to select the user interface 210 may mean that the user clicks a region, where the user interface 210 is displayed, through a mouth in a personal computer (PC) environment.

When the user interface 210 is selected by the user 110, the service server 130 may request an SNS sever 120 of FIG.

1 to transmit a group chat room list associated with the user 110 through an application program interface (API) call. In an example embodiment, information identifying the user 110 may be transmitted from the service server 130 to the SNS server 120. For example, the SNS server 120 may provide an API for inquiring and interworking with a group chat room list and may be provided to the service server 130. The service server 130 may request the SNS server 120 to transmit a group chat room list associated with the user 110 through an API call.

The SNS server 120 may transmit the group chat room list associated with the user 110 to the service server 130 in response to the request of the service server 130. The service server 130 may display the group chat room list on a service screen. FIG. 3 illustrates an example of displaying a group chat room list on a pop-up window 310 of a service screen.

When the user 110 selects one (e.g., a second group chat room) of displayed group chat rooms, the service server 130 may transmit information (including an identifier for identifying the second group chat room) and a link to content the user wants to share among content of a service to the SNS server 120. In an example embodiment, the content the user 110 wants to share may include various content according to services.

For one example, the user 110 who receive a game service may want to share a non-player character (NPC) by sharing a position of a character of the user 110 on a virtual space provided on the game service as the user 110 detects the NPC which appears on a game in a random way. In an example embodiment, a link to the content the user 110 wants to share may include a link for moving a character of another user, who accesses a service of the service server 130 through the link, to a shared position.

For another example, the user 110 may enter a specific instance dungeon through a game service. In an example embodiment, a link for content the user 110 wants to share may include a link for allowing a character of another user, who accesses a service of the service server 130, to enter a corresponding instance dungeon.

For another example, the user 110 may generate a game room and may select the user interface 210 to invite a user to progress a game together in the game room. In an example embodiment, a link to content the user 110 wants to share may include a link for allowing another user, who accesses a service of the service server 130 through the link, to enter the generated game room.

In addition to the game service, when the user 110 receives a video service, a link to content the user 110 wants to share may include a link to a page including a video which is currently reproducing by the user 110.

Also, the sharing of content using a group chat room may be applied to various services, such as a webtoon service, a news service, and a blog service, which are provided through a wired network or a wireless network.

The SNS server 120 may receive information about the selected group chat room and the link, may display the corresponding link through the selected group chat room, and may provide the link to participants of the selected group chat room.

Figure 4:
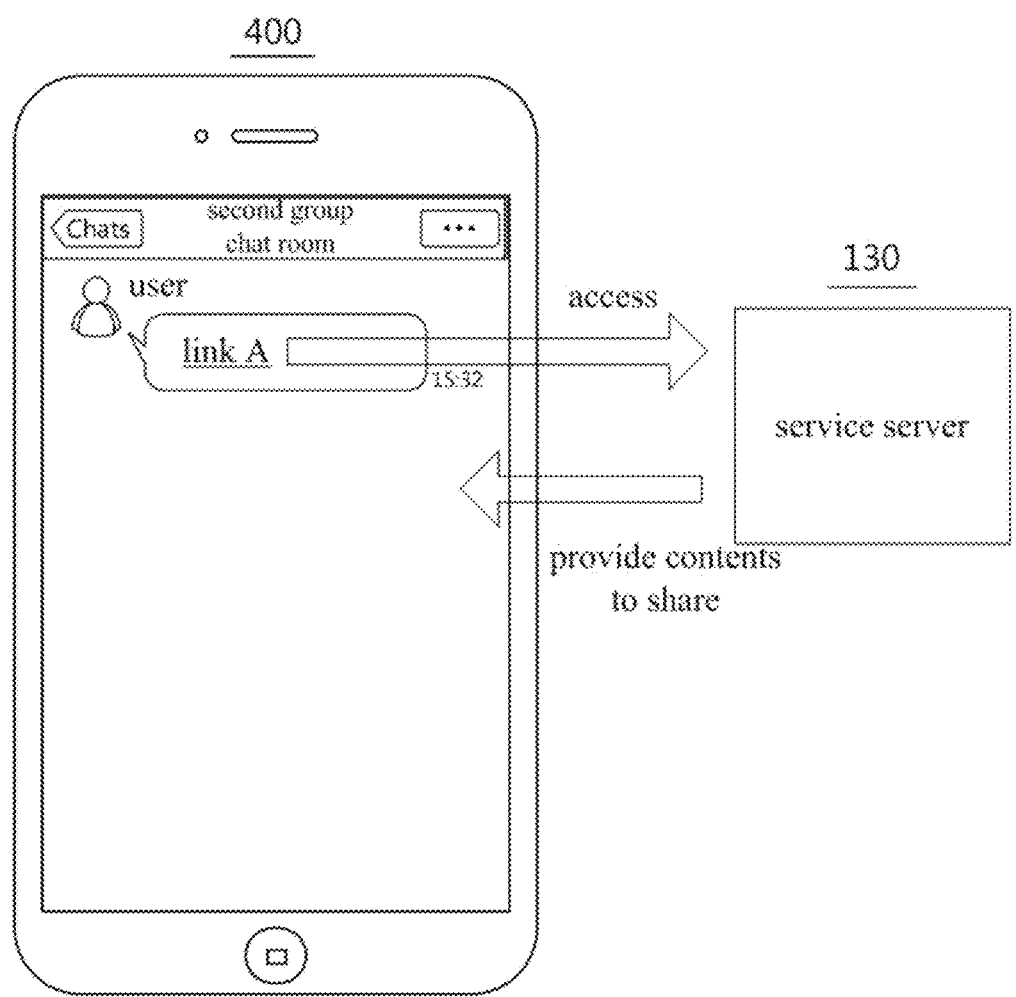
FIG. 4 is a drawing illustrating a process of providing a link through a group chat room according to an example embodiment of the inventive concepts.

FIG. 4 is a drawing illustrating a process of providing a link through a group chat room according to an example embodiment of the inventive concepts. FIG. 4 illustrates an example of a screen of a terminal 400 of another user. FIG. 4 illustrates an example in which a "link A" to content a user wants to share is displayed through a group chat room. This "link A" may be transmitted to all of participants of a group chat room. FIG. 4 illustrates an example of displaying the link. However, this link may be displayed together with an explanation for what this link is a link about. For example, when a user 110 of FIG. 1 detects a specific NPC and wants to share this NPC, a message for encouraging other users to click a link may be displayed together with the link.

When another user selects the "link A", the other user may access a service of a service server 130 of FIG. 1. In an example embodiment, a process of installing an application for providing a service or a log-in process for identifying other users, and the like may be added. When the other user access the service of the service server 130, the other user may receive content the user 110 wants to share according to the link and may share the content with the user 110. In the above-described NPC an example, a character of the other user may move to a position of the NPC, a position of a character of the user 110, or a position of the character of the user 110 at the moment that the user 110 selects a user interface 210 of FIG. 2.

Participants of a group chat room may include friends (e.g., other users who establish human relations with the user 110 through an SNS) of the user 110. The SNS server 120 may manage information about friends of the user 110 in connection with the user 110 and may manage group chat rooms which include the user 110 as a participant. The SNS server 120 may provide a list of these group chat rooms to the service server 130 according to a request of the service server 130 such that the user 110 selects a group chat room for sharing content.

Also, participants of a group chat room may include an unspecified number of other users. For example, the service server 130 may transmit information about at least some of members of a content providing service provided from the service server 130 to the SNS server 120. In an example embodiment, the SNS server 120 may generate a group chat room which includes at least one of the at least some of the members of the content providing service as a participant, through the received information and may manage the generated group chat room in connection with the user 110. In an example embodiment, a link to content the user 110 wants to share may be applied to an unspecified number of other uses. These other users may be members of the service server 130. In a game service an example, a specific dungeon may be used for recruiting party players. For example, the service server 130 may transmit information about corresponding users to the SNS server 120 to group the users who agree on receiving party recruitment information and to generate a group chat room.

For example, the SNS server 120 and the service server 130 may have the same operator or different operators. For example, members of the SNS provided from the SNS server 120 and members of the content providing service provided from the service server 130 may be members who are managed to be independent of each other. In an example embodiment, the SNS server 120 may attempt to perform promotion for joining members of the content providing service as members of the SNS, according to information about the members of the content providing service, which is received from the service server 130. For example, the SNS server 120 may transmit a message for encouraging members of the content providing service to subscribe to the SNS and/or participate in a group chat room using contact information (e.g., phone numbers, email addresses, and the like) of members, which are included in information about the members, which are received from the service server 130. In an example embodiment, the message may include a link to a sign-up page for subscribing to the SNS or a link for participating in a group chat room. The sign-up page for subscribing to the SNS may first be provided to members of the content providing service, who do not subscribe to an SNS yet.

Also, the SNS server 120 may provide rewards according to the subscription to the SNS and the participation in the group chat room to members of the content providing service. The rewards may be rewards for profit in the SNS, such as items usable in the SNS and may be rewards for profit in the content providing service, such as items or game money usable in the content providing service through joint promotion with the content providing service.

Also, a group chat room may include a representative account of a content providing service, which is provided from the service server 130, as a participant. This representative account may be an official account (OA) previously registered in the SNS server 120. In an example embodiment, irrespective of whether a group chat room is a group chat room in which the user 110 participates, the SNS server 120 may make a group chat room list of only group chat rooms in which the representative account of this content providing service is included as a participant and may provide the made group chat room list to the service server 130 such that the user 110 selects a group chat room for sharing content on the provided group chat room list. Therefore, the SNS server 120 may reduce the inefficiency that a conventional service system makes a list of all group chat rooms in which an unspecified number of other users, who act in the SNS server 120, participate and provides the made list to the service server 130. Also, the SNS server 120 may target only a group chat room (e.g., a group chat room in which a representative account of a content providing service participates) in which users who have an interest in a specific content providing service participate.

Figure 5:
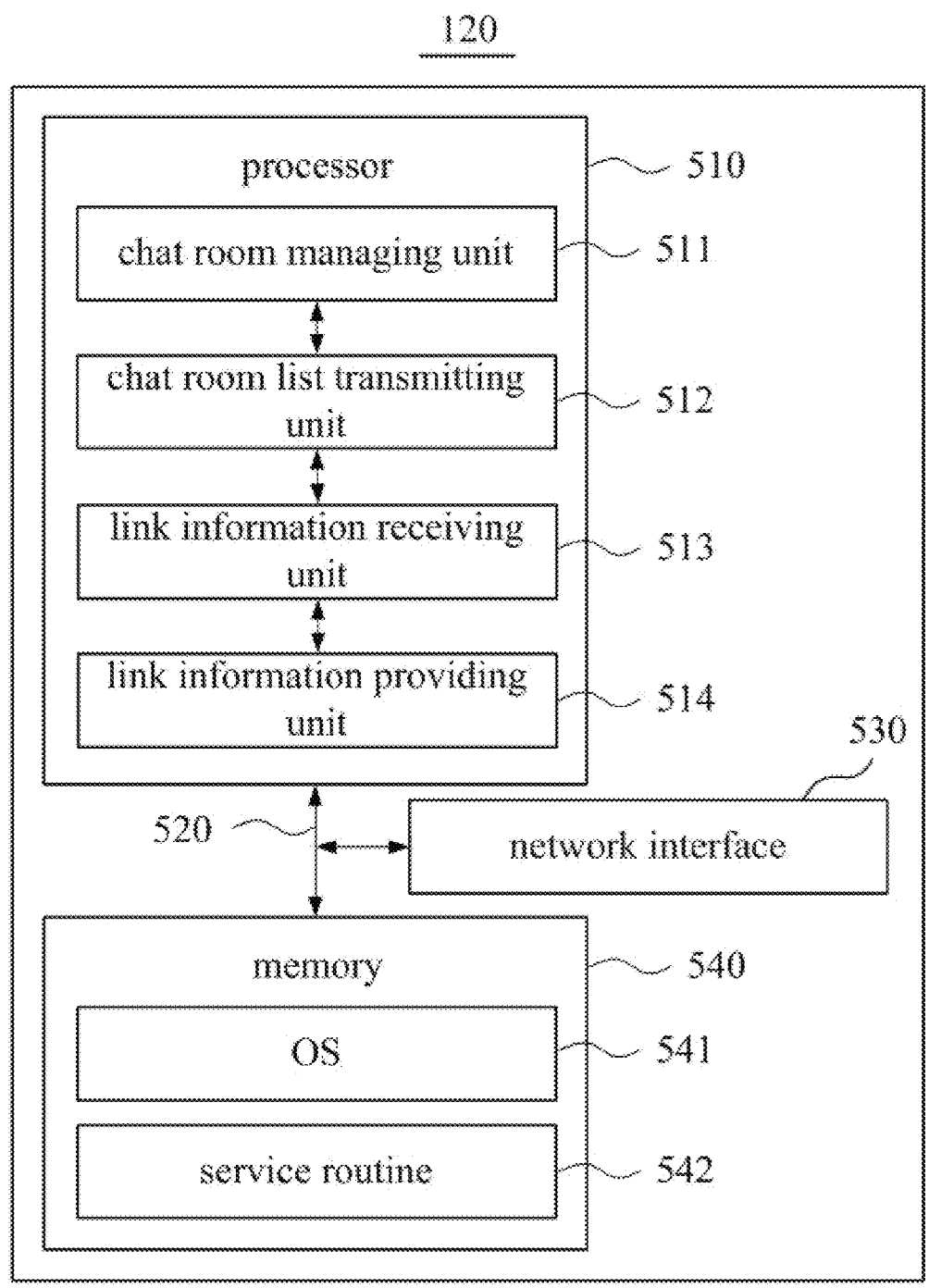
FIG. 5 is a block diagram illustrating a configuration of a service system according to an example embodiment of the inventive concepts.
Figure 6:
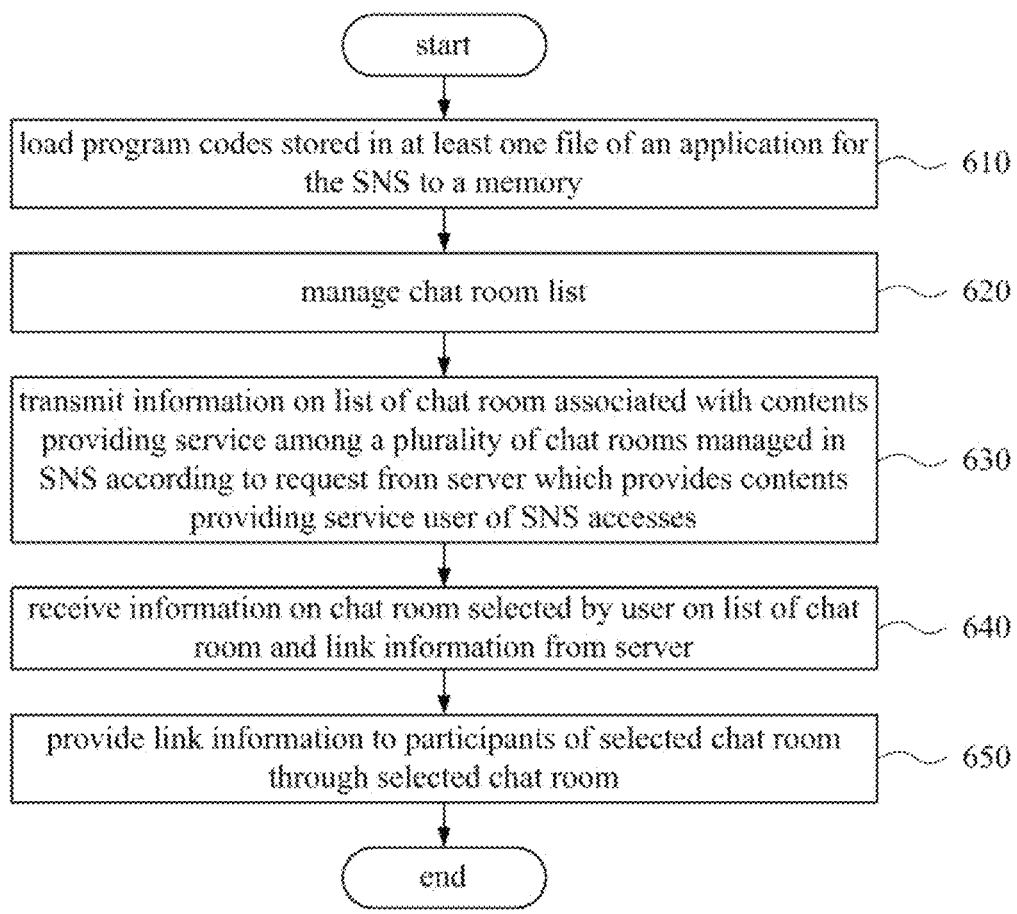
FIG. 6 is a flowchart illustrating an operation of a service method according to an example embodiment of the inventive concepts.

FIG. 5 is a block diagram illustrating a configuration of a service system according to an example embodiment of the inventive concepts. FIG. 6 is a flowchart illustrating an operation of a service method according to an example embodiment of the inventive concepts.

A service system 500 according to an example embodiment of the inventive concepts may correspond to the SNS server 120 described above. As shown in FIG. 5, the service system 500 may include a processor 510, a bus 520, a network interface 530, and a memory 540. The memory 540 may include an operating system (OS) 541 and a service routine 542. The processor 510 may include a chat room managing unit 512, a chat room list transmitting unit 512, a link information receiving unit 513, and/or a link information providing unit 514. Also, according to another example embodiment of the inventive concepts, the chat room list transmitting unit 512 may selectively include an API providing unit (not shown) and an information providing unit (not shown). Also, in other example embodiments of the inventive concepts, the service system 500 may include more elements than that of FIG. 5. However, there is no need for clearly illustrating most conventional elements. For example, the service system 500 may further include another element such as a display or a transceiver.

The memory 540 may be a computer-readable medium and may include permanent mass storage devices such as a random access memory (RAM), a read only memory (ROM), and a disc drive. Also, the memory 540 may store program codes for the OS 541 and the service routine 542. These software elements may be loaded from a computer-readable medium which is independent of the memory 540 using a drive mechanism (not shown). This computer-readable medium may include a computer-readable medium (not shown) such as a floppy drive, a disc, a tape, a Digital Versatile Disc (DVD)/compact disc (CD)-ROM drive, and a memory card. In another example embodiment of the inventive concepts, software elements may be loaded into the memory 540 through the network interface 530 other than the computer-readable medium. For example, the service routine 542 may be loaded into the memory 540 according to programs installed by files provided from developers through a network.

The bus 520 may facilitate communication and data transmission between elements of the service system 500. The bus 520 may be configured using a high-speed serial bus, a parallel bus, a storage area network (SAN), and/or other proper communication technologies.

The network interface 530 may be a computer hardware element for connecting the service system 500 to a computer network. The network interface 530 may connect the service system 500 to a computer network through a wireless or wired connection.

The processor 510 may be configured to process instructions of a computer program by performing a basic arithmetic operation, a basic logic operation, and an input-output operation of the service system 500. The instructions may be provided to the processor 510 through the bus 520 by the memory 540 or the network interface 530. The chat room managing unit 511, the chat room list transmitting unit 512, the link information receiving unit 513, and the link information providing unit 514 included in the processor 510 may be configured to execute program codes or instructions. This program codes or instructions may be stored in a recording device (e.g., the service routine 542) such as the memory 540.

In an example embodiment, the processor 510 configured as the chat room managing unit 511, the chat room list transmitting unit 512, the link information receiving unit 513, and the link information providing unit 514 may perform operations 610 and 650 of FIG. 6.

In operation 610, the processor 510 may load program codes stored in at least one file of an application for the SNS to a memory (e.g., the memory 540). For example, the at least one file of the application may be provided from file distribution server through a network and be installed the service system 500. When the application is executed, the processor 510 may load the program codes (or instructions) from the at least one file to memory.

In operation 620, the chat room managing unit 511 may manage a chat room list. As described above, the service system 500 according to an example embodiment of the inventive concepts may correspond to the SNS server 120 described above and may provide an SNS to a user. In an example embodiment, the chat room managing unit 511 may manage generated chat rooms. For example, the chat room managing unit 511 may execute a part of the program codes loaded in the memory to manage the chat room list.

In an example embodiment of the inventive concepts, in operation 620, the chat room managing unit 511 may generate and manage a chat room which includes other users (e.g., friends of the user), who establish human relations with the user in the SNS, as participants.

In another example embodiment of the inventive concepts, in operation 620, the chat room managing unit 511 may generate and manage a chat room which includes a representative account of a content providing service, which is registered in the SNS, as a participant. For example, the representative account of the content providing service may be an official account (OA) and may be registered in the SNS through linkage between the SNS and the content providing service. In an example embodiment, irrespective of whether a chat room is a chat room in which the user participants, the chat room managing unit 511 may make a chat room list of chat rooms which include the representative account of the content providing service as a participant and may provide the made chat room list to a server which provides the content providing service. In an example embodiment, the user may select a chat room for sharing content on the provided chat room list. Therefore, the chat room managing unit 511 may reduce the inefficiency that a conventional service system makes a list of all chat rooms in which an unspecified number of other users, who act in the SNS, participate and provides the made list to the server which provides the content providing service. Also, the chat room managing unit 511 may target only a chat room (e.g., a group chat room in which the representative account of the content providing service participates) in which users who have an interest in a specific content providing service participate.

In another example embodiment of the inventive concepts, in operation 620, the chat room managing unit 511 may generate and manage a chat room which includes at least one of other users, who does not establish human relations with the user in the SNS, as a participant. For example, the chat room managing unit 511 may manage a chat room in which an unspecified number of users participate.

In another example embodiment of the inventive concepts, operation 620 may include an operation (not shown) of receiving information about at least some of members of the content providing service from the server which provides the content providing service and an operation (not shown) of generating a group chat room which includes at least one of the at least some of the members as a participant through the received information. These operations (not shown) may be performed by the chat room managing unit 511. In an example embodiment, a link to content the user wants to share may be provided to an unspecified number of other users through a group chat room. These other users may be members of the content providing service. In a game service an example, a specific dungeon may be used for recruiting party players. For example, the server which provides the content providing service may transmit information about corresponding users to the service system 500 to group users who agree on receiving party recruitment information and to generate a group chat room.

In an example embodiment, the service system 500 may attempt to perform promotion for joining the members of the content providing service as members of the SNS, according to information about the members of the content providing service, which is received from the server which provides the content providing service. For example, the service system 500 may transmit a message for encouraging members of the content providing service to subscribe to the SNS and/or participate in a chat room using contact information (e.g., phone numbers, email addresses, and the like) of members, which are included in the information about the members, which are received from the server which provides the content providing service. In an example embodiment, the message may include a link to a sign-up page for subscribing to the SNS or a link for participating in a chat room. The sign-up page for subscribing to the SNS may first be provided to members of the content providing service, who do not subscribe to the SNS yet.

Also, the service system 500 may provide rewards according to the subscription to the SNS and the participation in the chat room to members of the content providing service. The rewards may be rewards for profit in the SNS, such as items usable in the SNS and may be rewards for profit in the content providing service, such as items or game money usable in the content providing service through joint promotion with the content providing service.

For this purpose, operation 620 may include an operation (not shown) of transmitting a message, for encouraging at least some of the members to subscribe to the SNS or participate in a chat room, to the at least some of the members and an operation (not shown) of providing predetermined and/or desired rewards to a user who subscribes in the SNS through a link included in the message or a user who participates in the chat room through the message. These operations (not shown) may be performed by the chat room managing unit 511.

In operation 630, the chat room list transmitting unit 512 may transmit information, about a list of chat rooms associated with the content providing service among a plurality of chat rooms managed in the SNS, to the server which provides the content providing service according to a request from the server which provides the content providing service a user of the SNS accesses. For example, the chat room list transmitting unit 512 may execute a part of the program codes loaded in the memory to transmit information.

The server which provides the content providing service may correspond to the service server 130 described above. The content providing service provided by the server may be, but is not limited to, a service, such as a game service or a video service, which may be provided to a terminal of the user through a wired network or a wireless network. In a game service an example, the server may provide the game service to the user and may request the service system 500 to transmit information about a chat room list associated with the content providing service according to a request of the user. In an example embodiment, the chat room list transmitting unit 512 may verify the information about the chat room list associated with the content providing service and may transmit the verified information to the server according to the request from the server.

In an example embodiment of the inventive concepts, operation 630 may include an operation (not shown) of providing an application program interface (API) for inquiring a chat room list to the server such that the server may request information about a chat room list and an operation (not shown) of providing information about a chat room list associated with the content providing service through an API call from the server. The operations (not shown) according to an example embodiment of the inventive concepts may be performed by the API providing unit (not shown) and the information providing unit (not shown) included in the chat room list transmitting unit 512.

In operation 640, the link information receiving unit 513 may receive information about the chat room selected by the user on the chat room list and link information from the server. For example, the link information receiving unit 513 may execute a part of the program codes loaded in the memory to receive information.

The chat room list transmitted to the server may be provided to the user. The user may select at least one chat room on the chat room list. In an example embodiment, the server may transmit information (e.g., an identifier for the selected chat room) about the selected chat room to the service system 500. Also, the server may generate link information and may transmit the generated link information together with the information about the selected chat room to the service system 500. In an example embodiment, the link information receiving unit 513 may receive the information about the chat room selected by the user and link information.

In operation 650, the link information providing unit 514 may provide the link information to participants of the selected chat room through the selected chat room. For example, the link information providing unit 514 may execute a part of the program codes loaded in the memory to provide the link information. The link information providing unit 514 may provide the link information to the participants of the selected chat room by displaying the link information through the selected chat room.

In an example embodiment, the link information may include a link for accessing content selected by the user among content of a service provided through the server or content the user receives. According to an example embodiment of the inventive concepts, a service the user accesses may include a game service. In an example embodiment, the link for accessing the content may include at least one of (1) a link for accessing a game room the user accesses or (2) a link for moving a character of another user who accesses through the link to a position or an instance space determined according to the link on a virtual space provided in the game service.

As such, participants of the selected chat room may select the corresponding link information and may participate in content the user wants to share.

Figure 7:
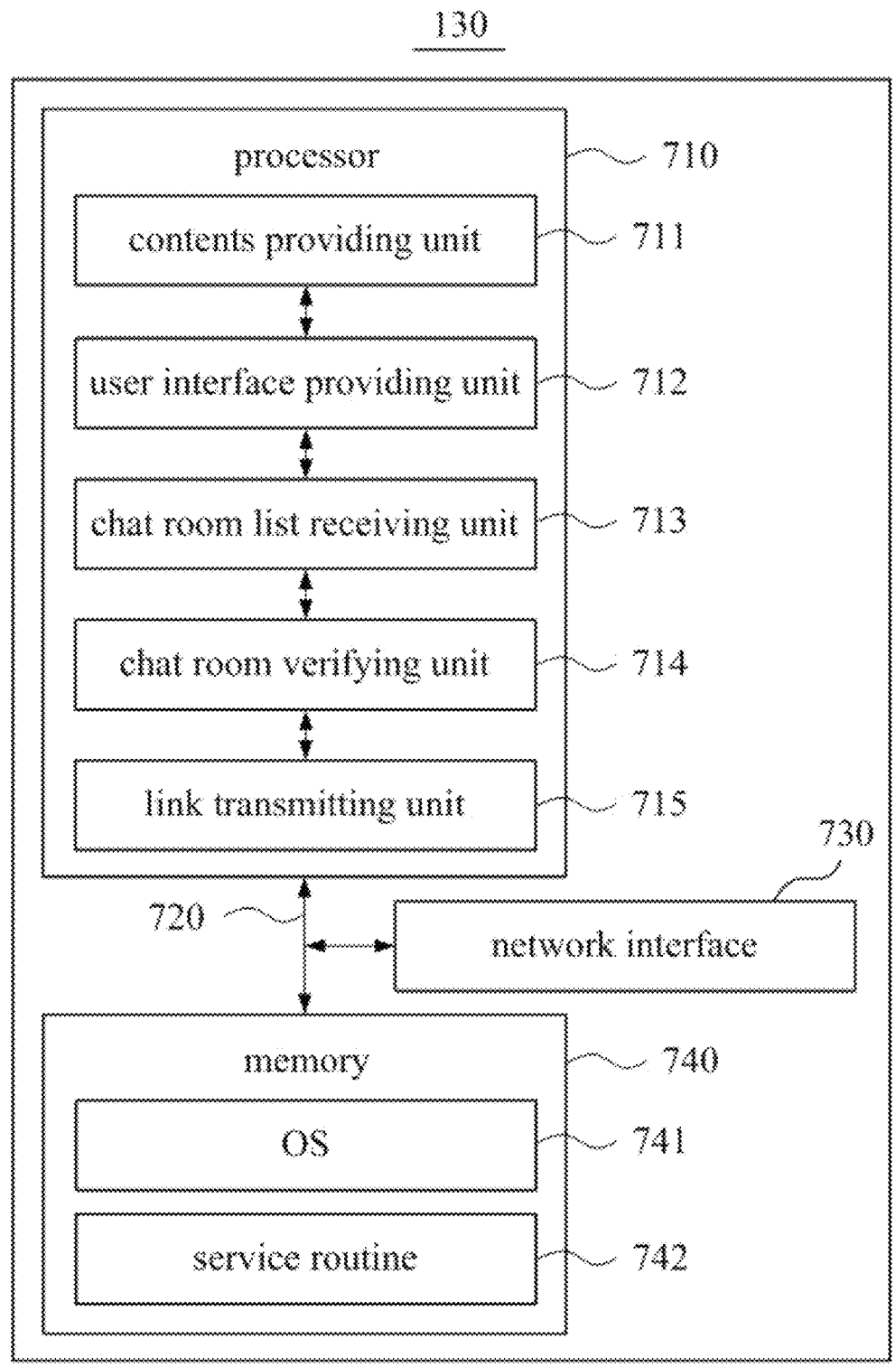
FIG. 7 is a block diagram illustrating a configuration of a service system according to another example embodiment of the inventive concepts.
Figure 8:
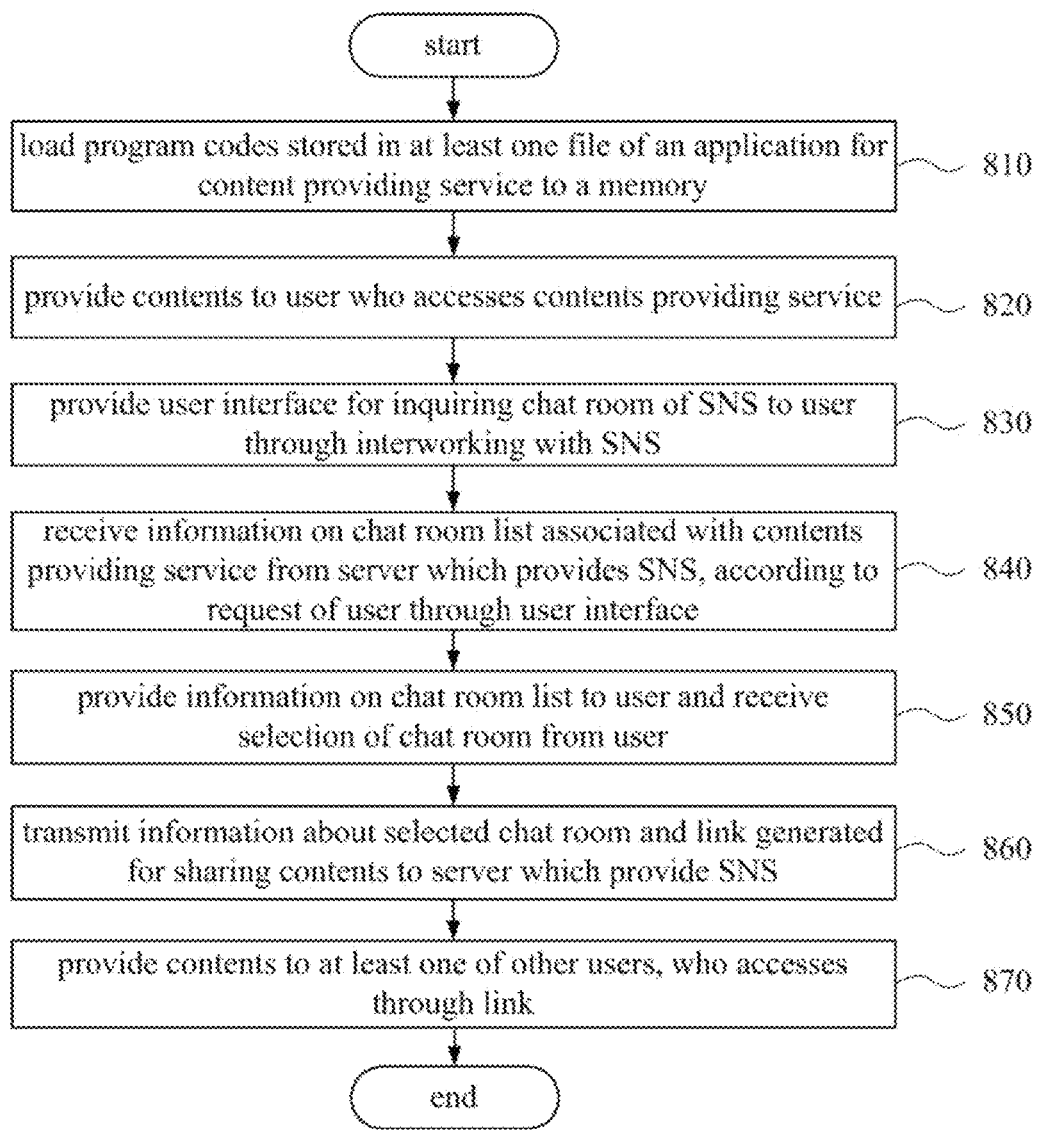
FIG. 8 is a flowchart illustrating an operation of a service method according to another example embodiment of the inventive concepts.

FIG. 7 is a block diagram illustrating a configuration of a service system according to another example embodiment of the inventive concepts. FIG. 8 is a flowchart illustrating an operation of a service method according to another example embodiment of the inventive concepts.

A service system 700 according to an example embodiment of the inventive concepts may correspond to the service server 130 described above. As shown in FIG. 7, the service system 700 may include a processor 710, a bus 720, a network interface 730, and/or a memory 740. Since the processor 710, the bus 720, the network interface 730, and the memory 740 may correspond to the processor 510, the bus 520, the network interface 530, and the memory 540 which are described above with reference to FIG. 5, a repeated description for this is omitted. In an example embodiment, the processor 710 may include a content providing unit 711, a user interface providing unit 712, a chat room list receiving unit 713, a chat room verifying unit 714, and/or a link transmitting unit 715. Also, according to another example embodiment of the inventive concepts, the user interface providing unit 712 may selectively include an API receiving unit (not shown) and a providing unit (not shown).

In an example embodiment, the processor 710 configured as the content providing unit 711, the user interface providing unit 712, the chat room list receiving unit 713, the chat room verifying unit 714, and/or the link transmitting unit 715 may perform operations 810 to 870 of FIG. 8.

In operation 810, the processor 710 may load program codes stored in at least one file of an application for the content providing service to a memory (e.g., the memory 940). For example, the at least one file of the application may be provided from file distribution server through a network and be installed the service system 700. When the application is executed, the processor 710 may load the program codes from the at least one file to memory.

Each of the content providing unit 711, the user interface providing unit 712, the chat room list receiving unit 713, the chat room verifying unit 714, and/or the link transmitting unit 715 may execute a part of the program codes (or instructions) in the memory to process operations 820 to 870.

In operation 820, the content providing unit 711 may provide content to a user who accesses the content providing service. The service system 700 according to an example embodiment of the inventive concepts may correspond to the service server 130 described above and may provide at least one of various services such as a game service and a video service. For example, when providing the game service, the content providing unit 711 may provide various content, such as instance dungeons or NPCs which appear in a random way, to the user.

In operation 830, the user interface providing unit 712 may provide an interface, for inquiring a chat room of a social network service (SNS), to the user through interworking with the SNS. For example, the user interface providing unit 712 may be implemented such that a specific user interface is displayed on a service screen displayed on a terminal of the user and such that the user selects (e.g., clicks or taps) the user interface.

In operation 840, the chat room list receiving unit 713 may receive information on a chat room list associated with the content providing service from a server which provides the SNS, according to a request of the user through the user interface. In the above-described example, when the user selects the user interface displayed on a screen of the terminal, the terminal of the user may request the service system 700 to transmit the chat room list. The service system 700 may request the server which provides the SNS to transmit a chat room list associated with the content providing service. The server which provides the SNS may correspond to the SNS server 120 described above. The chat room list receiving unit 713 may receive the information on the chat room list associated with the content providing service from the server which provides the SNS.

In operation 850, the chat room verifying unit 714 may provide the information on the chat room list to the user and may verify information about a chat room selected by the user. As described with reference to FIG. 3, a chat room list received in the service system 700 may be transmitted to the terminal of the user to be displayed on the terminal of the user. In an example embodiment, when the user selects at least one chat room on the chat room list, information about the selected chat room may be transmitted to the service system 700. The chat room verifying unit 714 may verify the transmitted information about the chat room.

In operation 860, the link transmitting unit 715 may transmit the verified information about the chat room and a link generated for sharing content to the server which provides the SNS. In an example embodiment, the link may be provided to participants of a chat room verified through the server which provides the SNS.

In operation 870, the content providing unit 711 may provide content to at least one of other users, who accesses through the link. In an example embodiment, the content may be content previously provided to the user. The user may select a chat room to expose a link through the chat room. Other users may select the link to share content between the user and the other users. In a game service as an example, in operation 870, the content providing unit 711 may allow another user to access a game room the user accesses, or may move a character of another user to a position or instance space determined according to the link on a virtual space provided in the game service.

Since the description is given of the participants included in the chat room or the configuration using the API for providing the chat room list through the user interface, a repeated description for this is omitted.

As such, according to example embodiments of the inventive concepts, other users may immediately access content the user receives or content selected by the user through the link by providing an API which may inquire and interwork with a group chat room list to a service the user accesses, by a provider of the SNS which provides the group chat room service, providing a group chat room list of the SNS to the user through an API call according to a request of the user, by a server which provides the service the user accesses, and transmitting a link to content the user receives or content selected by the user to a group chat room selected by the user.

Also, the user may simply share content with an unspecified number of other users as well as friends who establish human relations with the user by providing a function of inquiring and interworking with a group chat room associated with the third party service as well as a group chat room with other users who establish human relations with the user.

Therefore, the user may share content with an unspecified number of other users as well as friends of the user by selecting a desired group chat room on a provided group chat room list without the necessity of separately contacting other users with respect to content the user wants to share or directly transmitting an access function to the content the user wants to share to other users.

Also, since content providers is not required to implement the additional function for the sharing of content, the data usage, resource usage and amount of computation can be reduced in service servers of the content providers.

The foregoing devices may be realized by hardware elements, software elements and/or combinations thereof. For example, the devices and components illustrated in the example embodiments of the inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described example embodiments of the inventive concepts may be implemented with program instructions which may be executed by various computer means and may be recorded in computer-readable media. The computer-readable media may also include, alone or in combination with the program instructions, data files, data structures, and the like. The program instructions recorded in the media may be designed and configured specially for the example embodiments of the inventive concepts or be known and available to those skilled in computer software. Computer-readable media may include magnetic media such as hard disks, floppy disks, and magnetic tape; optical media such as CD ROM disks and DVDs; magneto-optical media such as floptical disks; and hardware devices which are specially configured to store and perform program instructions, such as a read-only memory (ROM), a random access memory (RAM), a flash memory, and the like. Program instructions may include both machine codes, such as produced by a compiler, and higher-level language codes which may be executed by the computer using an interpreter. The described hardware devices may be configured to act as one or more software modules to perform the operations of the above-described example embodiments of the inventive concepts, or vice versa.

While a few example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implementations, other embodiments, and equivalents to claims are within the scope of the following claims.

What is claimed is:

1. A service method in a service system, implemented with a computer, for providing a social network service (SNS), the method comprising:

transmitting, using at least one processor, information related to a list of chat rooms associated with a user of a content providing service among a plurality of chat rooms managed by the SNS, to a content service server in response to a request from the content service server, the content service server configured to provide the content providing service to users of the content providing service;

receiving, using the at least one processor, selection information of a chat room selected by the user from the list of chat rooms of the SNS, and link information related to content included in the content providing service from the content service server; and transmitting, using the at least one processor, the link information to participants of the selected chat room through the selected chat room via the SNS, wherein the link information comprises a link for accessing content selected by the user or content the user receives among the content of the content providing service, the link causing terminals of the participants to install a software application related to the content providing service or automatically sign into the content providing service to access the content.

2. The method of claim 1, wherein the selected chat room is associated with the content providing service and includes other users registered with the SNS and have a SNS relationship established with the user in the SNS, as chat participants.

3. The method of claim 1, wherein the selected chat room is associated with the content providing service and includes a representative account of the content providing service, which is registered in the SNS, as a chat participant.

4. The method of claim 1, wherein the selected chat room is associated with the content providing service and includes at least one other users, who does not have a SNS relationship established with the user in the SNS, as a chat participant.

5. The method of claim 1, wherein the transmitting of the information related to the list of the chat rooms associated with the user of the content providing service comprises:
   transmitting information about a plurality of members of the content providing service associated with the chat rooms listed in the list of chat rooms associated with the user; and
   generating a group chat room including at least one of the plurality of members as a chat participant based on the transmitted information about the plurality of members of the content providing service.

6. The method of claim 5, wherein the generating of the group chat room comprises:
   transmitting a message, for encouraging the plurality of members to subscribe to the SNS or participate in the group chat room, to the plurality of members; and
   providing rewards to a member of the plurality of members who subscribes to the SNS through a link included in the message or a member of the plurality of members who participates in the group chat room through the message.

7. The method of claim 1, wherein the transmitting of the information related to the list of the chat rooms associated with the user of the content providing service comprises:
   providing an application program interface (API) for inquiring about the list of the chat rooms to the content service server; and
   providing information on the list of the chat rooms associated with the user in response to an API call from the content service server.

8. The method of claim 1, wherein
   the content providing service comprises a game service; and
   the link for accessing the content comprises at least one of a link for accessing a game room the user has accessed or a link for moving a character of another user who accesses the game room through the link to a position or an instance space determined according to the link on a virtual space provided in the game service.

9. A service method in a service system, implemented with a computer, for providing a content providing service, the method comprising:
   transmitting, using at least one processor, content to a user who accesses the content providing service;
   transmitting, using the at least one processor, a user interface for inquiring about a chat room of a social network service (SNS) to the user through interworking with the SNS;
   receiving, using the at least one processor, information on a chat room list associated with the user from a SNS server which provides the SNS, according to a request of the user through the user interface;
   transmitting, using the at least one processor, the information on the chat room list to the user and receiving selection of a chat room from the list of chat rooms from the user;
   transmitting, using the at least one processor, information about the selected chat room and a link generated for sharing the content related to the content providing service to the SNS server; and
   transmitting, using the at least one processor, the content to at least one of other users of the selected chat room, who accesses the content through the link,
   wherein the link is provided to participants of the selected chat room through the SNS server, the link causing terminals of the participants to install a software application related to the content providing service or automatically sign into the content providing service to access the content.

10. The method of claim 9, wherein the receiving of the information on the chat room list associated with the user comprises:
    receiving the list of chat rooms, at least one of the chat rooms including other users registered with the SNS and have a SNS relationship established with the user in the SNS, as chat participants.

11. The method of claim 9, wherein the receiving of the information on the chat room list associated with the user comprises:
    receiving the list of chat rooms, the chat rooms including a representative account of the content providing service, which is registered in the SNS, as a chat participant.

12. The method of claim 9, wherein the receiving of the information on the chat room list associated with the user comprises:
    receiving the list of chat rooms, at least one of the chat rooms including at least one other users, who does not have a SNS relationship established with the user in the SNS, as a chat participant.

13. The method of claim 9, wherein the transmitting of the user interface for inquiring about the chat room of the SNS to the user comprises:
    receiving an application program interface (API) for inquiring about the chat room list from the SNS server; and
    generating the user interface, the generating including generating an API call to the SNS server using the API; and
    displaying the generated user interface to the user on a display device.

14. The method of claim 9, wherein
    the content providing service comprises a game service; and
    the transmitting of the content to the at least one of the other users, who accesses the content through the link, further includes,
        allowing the at least one of the other users to access a game room associated with the game service that the user accessed or moving a character of the at least one of the other user, which accesses the game room through the link, to a position or an instance space determined according to the link on a virtual space provided in the game service.

15. A non-transitory computer-readable medium having embodied thereon a program for executing the method of claim 1.

16. A service system for providing a social network service (SNS), the system comprising:
    a processor configured to:
        manage a chat room list associated with a user of the SNS;
        transmit information related to the chat room list to a content service server in response to a request from the content service server, the content service server configured to provides the content providing service to users of the content providing service;

receive selection information of a chat room selected by the user from the chat room list and link information related to content included in the content providing service from the content service server; and transmit the link information to participants of the selected chat room through the selected chat room via the SNS, wherein the link information comprises a link for accessing content selected by the user or content the user receives among content of the content providing service provided through the content service server, the link causing terminals of the participants to install a software application related to the content providing service or automatically sign into the content providing service to access the content.

17. The system of claim 16, wherein the processor is configured to generate and manage a chat room which includes other users registered with the SNS and have a SNS relationship established with the user in the SNS, as chat participants.

18. The system of claim 16, wherein the processor is configured to generate and manage a chat room which includes a representative account of the content providing service, which is registered in the SNS, as a chat participant.

19. The system of claim 16, wherein the processor is configured to generate and manage a chat room which includes at least one other users, who does not have a SNS relationship established with the user in the SNS, as a chat participant.

20. The system of claim 16, wherein
the content providing service comprises a game service; and
the link for accessing the content comprises at least one of a link for accessing a game room the user has accessed or a link for moving a character of another user who accesses the game room through the link to a position or an instance space determined according to the link on a virtual space provided in the game service.

21. A service system for providing a content providing service, the system comprising:
a processor configured to,
transmit content related to the content providing service to a user who accesses the content providing service;
transmit a user interface for inquiring about a chat room of a social network service (SNS) to the user through interworking with the SNS;
receive information on a chat room list associated with the user of the content providing service from a SNS server which provides the SNS, in response to a request of the user through the user interface;
transmit the information on the chat room list to the user and receive selection of a chat room of the chat room list from the user; and
transmit information about the selected chat room and a link generated for sharing the content to the SNS server,
wherein the SNS server is configured to transmit the link to participants of the selected chat room through the SNS,
the processor is configured to provide the content to at least one of the other users of the chat room, who accesses the chat room through the link, and
the link causes terminals of the other users to install a software application related to the content providing service or automatically sign into the content providing service to access the content.

22. The system of claim 21, wherein the processor is configured to receive the list of chat rooms, at least one of the chat rooms including other users registered with the SNS and have a SNS relationship established with the user in the SNS, as chat participants.

23. The system of claim 21, wherein the processor is configured to receive the list of chat rooms, at least one of the chat rooms including a representative account of the content providing service, which is registered in the SNS, as a chat participant.

24. The system of claim 21, wherein
the content providing service comprises a game service; and
the processor is configured to allow the at least one of the other users to access a game room associated with the game service that the user accessed or moves a character of the at least one of the other users, which accesses the game room through the link, to a position or an instance space determined according to the link on a virtual space provided in the game service.

* * * * *